United States Patent
Francis et al.

(10) Patent No.: US 6,497,537 B1
(45) Date of Patent: Dec. 24, 2002

(54) SLOTTING CUTTER WITH CARTRIDGE ASSEMBLY

(75) Inventors: Mark A. Francis, Solon, OH (US); Kay E. Kucharik, Maple Heights, OH (US); David C. Machacek, Northfield Center, OH (US); Donald P. Morris, Concord, OH (US)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 09/464,822

(22) Filed: Dec. 17, 1999

(51) Int. Cl.⁷ ............... B23C 5/08; B23C 5/24
(52) U.S. Cl. ............ 407/37; 407/46; 407/52; 407/58; 83/839
(58) Field of Search ............ 407/113–116, 34, 407/35, 117, 58, 46, 51, 52, 42, 12; 83/839

(56) References Cited

U.S. PATENT DOCUMENTS

| | | | |
|---|---|---|---|
| 2,037,642 A | | 4/1936 | Scribner |
| 3,116,538 A | | 1/1964 | Severson |
| 3,200,474 A | * | 8/1965 | Kralowetz ............ 407/46 |
| RE27,192 E | * | 10/1971 | Milewski ............ 407/46 |
| 3,701,187 A | | 10/1972 | Erkfritz |
| 3,729,808 A | * | 5/1973 | Wolf et al. ............ 407/51 |
| 3,754,309 A | | 8/1973 | Jones et al. |
| 3,757,397 A | | 9/1973 | Lindsay |
| 3,821,837 A | | 7/1974 | Faber |
| 3,887,975 A | | 6/1975 | Sorice et al. |
| 3,940,835 A | | 3/1976 | Friedline et al. |
| 4,097,174 A | * | 6/1978 | Heinlein ............ 407/46 |
| 4,222,298 A | * | 9/1980 | James ............ 83/853 |
| 4,363,576 A | | 12/1982 | Zweekly |
| 4,714,383 A | * | 12/1987 | Shimomura et al. ............ 407/42 |
| 5,090,845 A | * | 2/1992 | Bentjens ............ 407/52 |
| 5,163,788 A | * | 11/1992 | Dahl et al. ............ 407/46 |
| 5,676,505 A | * | 10/1997 | Gauss et al. ............ 407/51 |
| 5,800,079 A | | 9/1998 | Qvarth |
| 6,062,775 A | * | 5/2000 | Satran et al. ............ 407/46 |

FOREIGN PATENT DOCUMENTS

| | | |
|---|---|---|
| EP | 0873808 | 10/1998 |
| FR | 2443308 | 4/1980 |

OTHER PUBLICATIONS

International Search Report mailed Feb. 9, 2001 in counterpart PCT application No. PCT/US00/30641.

* cited by examiner

*Primary Examiner*—A. L. Wellington
*Assistant Examiner*—Erica Ergenbright Cadugan
(74) *Attorney, Agent, or Firm*—Larry R. Meenan

(57) ABSTRACT

A slotting cutter including a support disc rotatable in a predetermined direction on a central axis. The support disc is of a generally cylindrical shape having a first side and a second side, and an outer periphery. A plurality of pockets including a cartridge assembly are staggered about the outer periphery of the support disc and include a cutting insert secured to each cartridge assembly. Each cutting insert includes at least one cutting edge. The cutting insert extends laterally outwardly beyond the first side of the support disc and is spaced from the second side of the support disc such that the cutting edge of adjacent inserts are positioned to laterally overlap thereby providing an increased effective cutting path width.

18 Claims, 6 Drawing Sheets

SLOTTING CUTTER WITH CARTRIDGE ASSEMBLY

FIELD OF THE INVENTION

The present invention relates to a slotting cutter with a cartridge assembly. More particularly, the present invention relates to a slotting cutter including a cartridge assembly for securing multiple opposing inserts capable of cutting to a flat bottom and also contour cutting the side and/or the bottom of a slot in a work piece in as many as 5 axes.

BACKGROUND OF THE INVENTION

Slotting cutters are known for cutting keyways and the like and, also, for providing a work piece with slots of various width.

Slotting cutters of the nature referred to are somewhat similar to milling cutters in that the cutter usually employs a disc-like member having cutting inserts mounted in the periphery thereof. In a milling cutter, the cutting inserts are generally presented axially, whereas, in a slotting cutter, the cutting inserts protrude radially from the supporting disc and are, thus, presented to the work piece in the radial direction.

For a more detailed description of the operation of a slotting cutter reference is made to U.S. Pat. No. 3,940,835, incorporated herein by reference.

In order to form slots rapidly and efficiently, it is essential that the cutting inserts be solidly supported in the support disc and have adequate clearance between the cutting edges of the inserts and the support disc as the material is removed from the work piece. With the inserts solidly supported and having sufficient clearance between the support disc and the cutting edges, the slotting cutter is able to withstand substantial loads and can cut extremely rapidly, freely and accurately while maintaining the ability to easily discharge large volumes of chips that may be generated during the cutting process.

With the foregoing in mind, a primary object of the present invention is the provision of a slotting cutter of improved design.

Another object is the provision of a cutting insert for detachably mounting in the slotting cutter and especially adapted for use therewith.

BRIEF SUMMARY OF THE INVENTION

Briefly, according to the present invention, there is provided a slotting cutter including a support disc rotatable in a predetermined direction on a central axis. The support disc is of a generally cylindrical shape having a first side and a second side, and an outer periphery. A plurality of pockets including a cartridge assembly are staggered about the outer periphery of the support disc. A cutting insert is secured to each cartridge assembly. Each cutting insert includes at least one cutting edge. The cutting insert extends laterally outwardly beyond the first side of the support disc and is spaced from the second side of the support disc whereby the cutting edge of adjacent inserts are positioned to laterally overlap thereby providing an increased effective cutting path width.

BRIEF DESCRIPTION OF THE DRAWINGS

The above, as well as other features and advantages of the invention, will become apparent through consideration of the detailed description in connection with the several drawings in which.

DETAILED DESCRIPTION OF THE INVENTION

Figure 1:
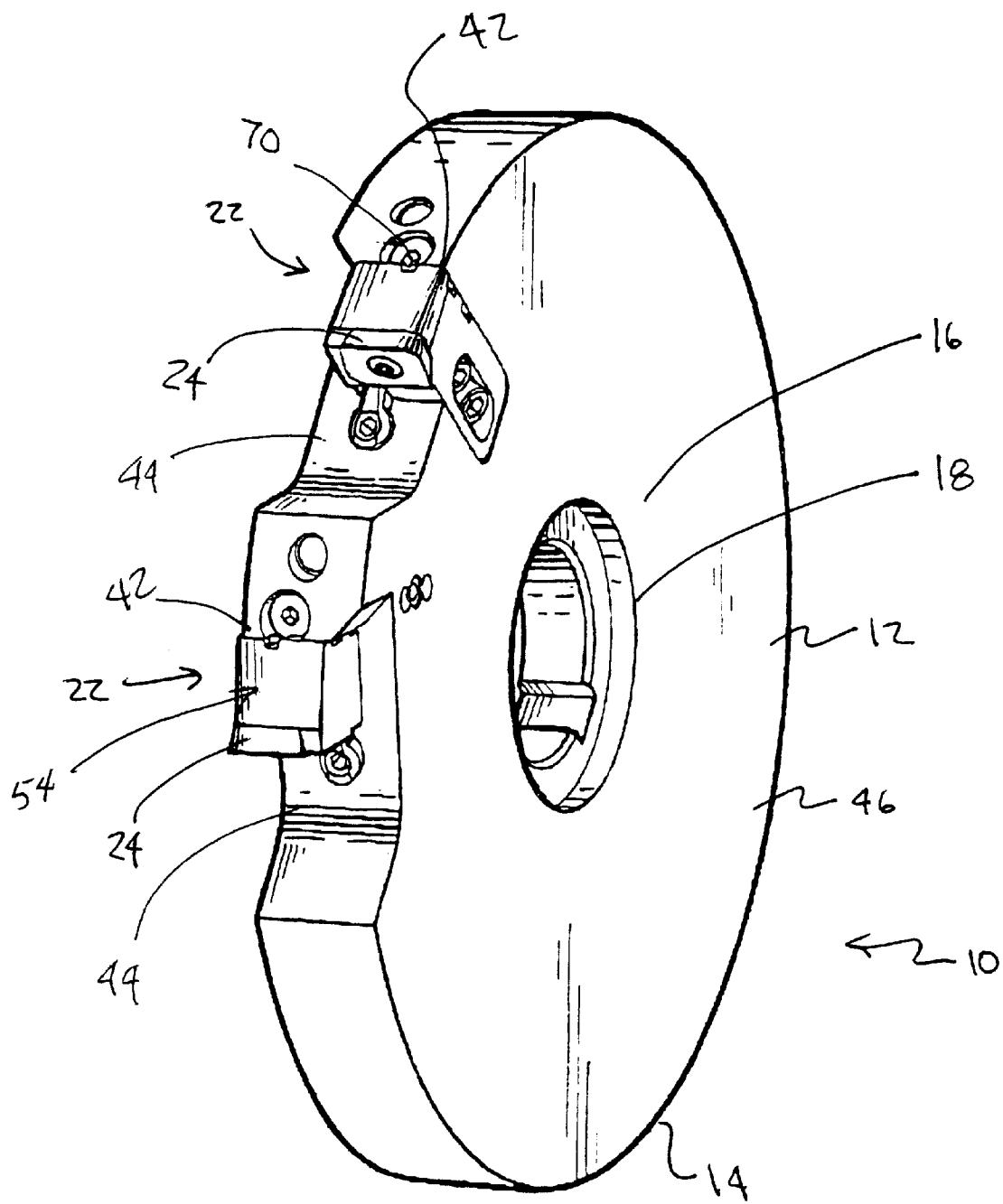
FIG. 1 is a perspective view of a slotting cutter according to the present invention.

Referring to the drawings wherein like reference characters represent like elements, there is shown a slotting cutter 10. The slotting cutter 10 includes a support disc 12 that is rotatable in a predetermined direction on a central axis perpendicular to the plane of the disc. When using the slotting cutter at high speed, a balance screw may be used to maintain the rotational balance of the support disc.

The support disc is of a generally cylindrical shape having an outer periphery 14, a first side 50, and a second side 46. A central hub region 16 extends through the first side 50 and second side 46 and is provided with a bore 18 with a keyway 20 for receiving a drive key of a support shaft. As well known in the art, rotative motion is imparted to the slotting cutter 10 via the drive key which mates with drive keyway 20.

In a preferred embodiment, the support disc 12 width may be about ½ to 3 inches or more and the diameter may be about 7.8 inches or more depending upon the desired application. Furthermore, the first and second side 50 and 46 of the support disc may be tapered to aid in chip exit and cutter clearance during 5-axis cutting.

Figure 5:
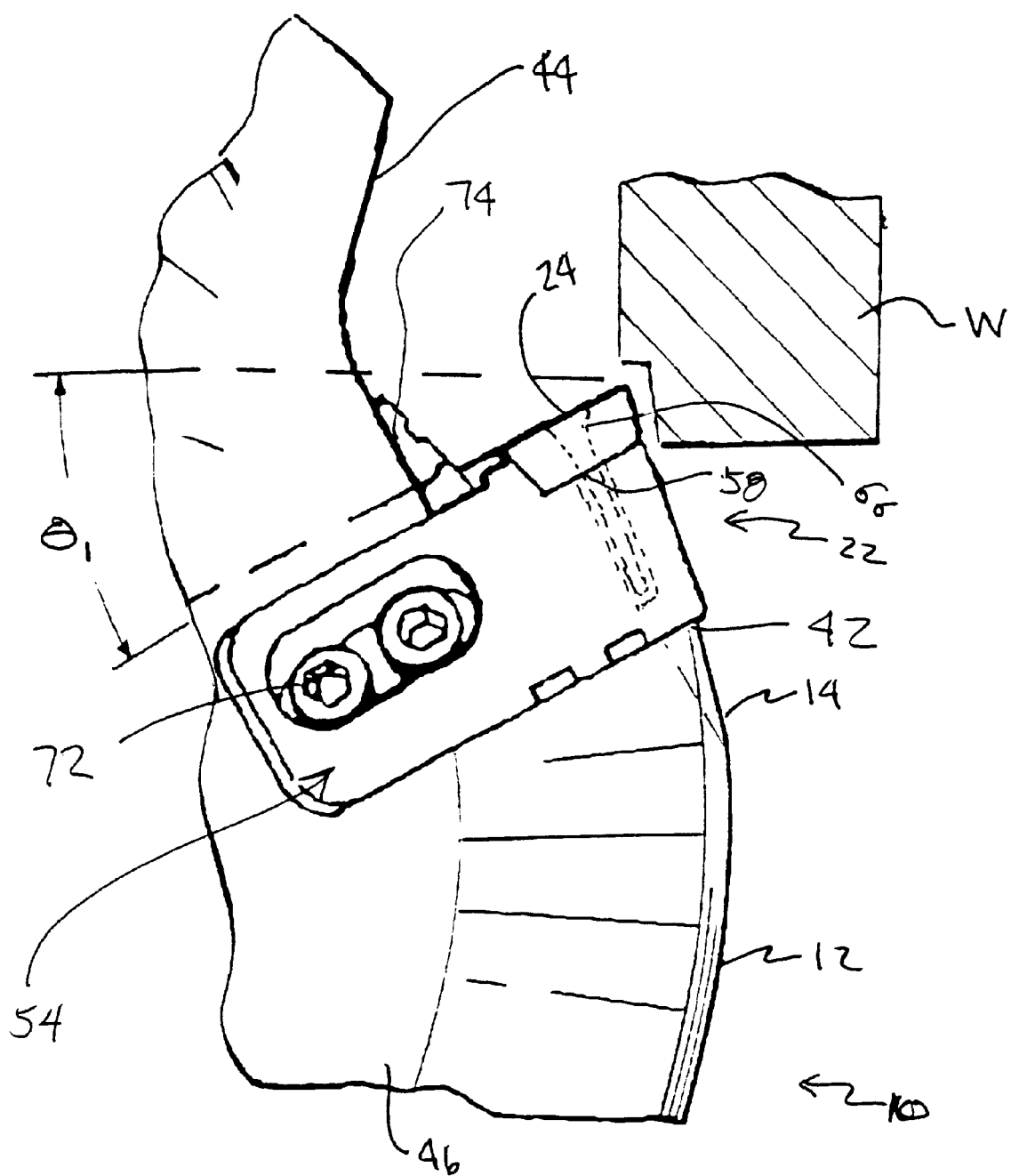
FIG. 5 is an enlarged partial side view of the slotting cutter of FIG. 2.
Figure 6:
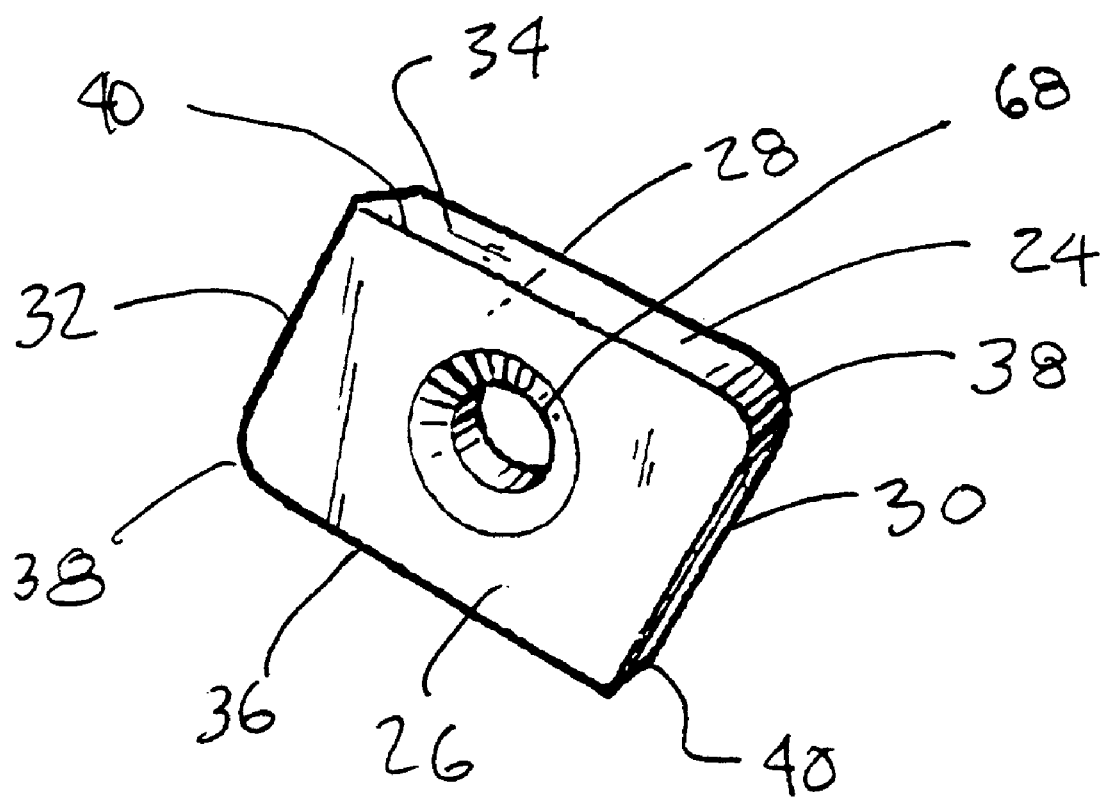
FIG. 6 is a perspective view of a cutting insert for use in the slotting cutter of FIG. 1.

Provided about the periphery of the support disc 12 are a plurality of staggered pockets 22 for receiving cutting inserts 24 including at least one cutting edge. As shown in FIG. 5, the cutting inserts 24 are fixed in position at a positive angle $\theta_1$ to cut the work piece W and efficiently remove the chips.

The cutting inserts 24 may be of a type well known in the art. The cutting inserts 24 typically have a first face 26 and a second face 28 which are generally parallel to and opposing each other. A first end 30 and a second end 32 are between the first and second faces, respectively. A top end 34 and a bottom end 36 are between the first and second faces and intersect with first and second ends. The intersection of top end 34 and first end 30 and bottom end 36 and second end 32 is in the form a radiused corner 38. Each of the cutting inserts 24 is provided with a cutting edge 40 at the intersection of the first face 26 and top end 34 and the second face 28 and bottom end 36. Each insert 24, thus, has two cutting edges 40 and these cutting edges can be selectively presented to a workpiece by loosening an insert and indexing the insert about an axial axis and then again clamping the insert in the pocket as further described herein. As well known in the art, the cutting inserts 24 may be formed of a hard wear resistant material such as cemented carbide and the like.

The pockets 22 of the slotting cutter 10 are configured to provide increased lateral clearance between the cutting edges 40 and the ends 30 and 32 of the inserts 24 and the support disc 12. The pockets 22 are positioned about the circumference of the support disc 12 in an axially staggered relationship to define left hand and right hand pockets.

It will be appreciated that most any suitable number of pockets 22 may be formed in the support disc 12 depending upon the desired material of the work piece to be cut and the diameter of the support disc. Although most any suitable number of pockets 22 may be employed, there must be an even number of pockets to provide an equal number of cutting inserts for cutting the work piece. In a preferred embodiment, the slotting cutter 10 includes eight pockets 22 equally spaced about the perimeter of the support disc 12.

Figure 2:
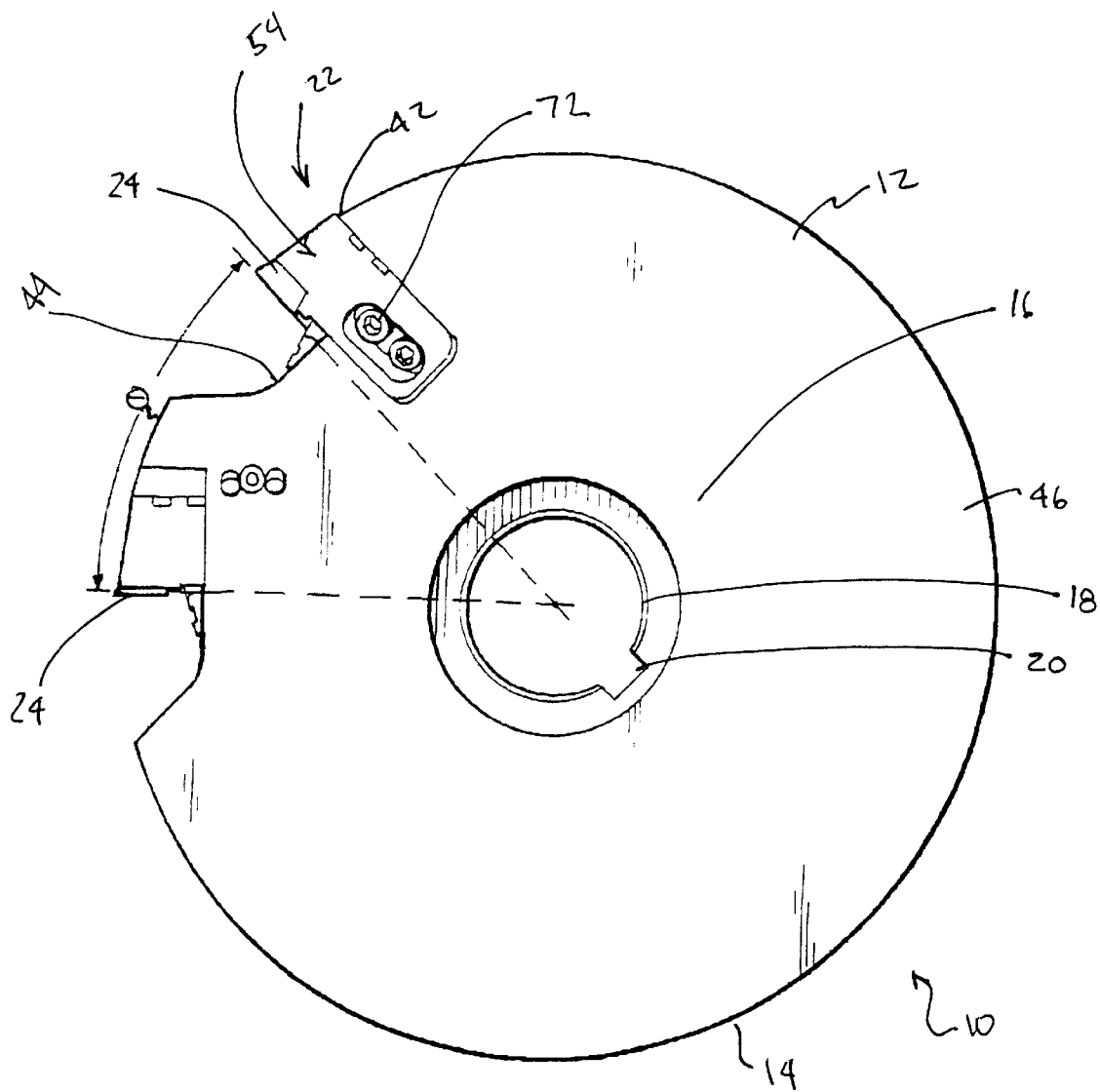
FIG. 2 is a side view of the slotting cutter of FIG. 1.

As shown in FIGS. 2 and 5, each pocket 22 opens radially outwardly as defined by a rear wall 42 and a bottom wall 44. The rear walls 42 of adjacent pockets 22 are positioned about the circumference of the support disc 12 at an angle $\theta_2$ of approximately 45 degrees thereby defining eight total pockets in the support disc.

The bottom wall 44 of each pocket 22 is substantially perpendicular to a radial line 52 of the support disc 12. The bottom wall 44 extends outwardly from the rear wall 42 toward the rear of the next preceding pocket. The bottom wall 44 is connected to the next preceding pocket through a connecting section that may curve upwardly to the rear wall 42 (FIG. 2) or that may extend linearly toward the rear of the next pocket. For example, in a preferred embodiment, the bottom wall 44 is spaced about 3 inches along the radial line 28 of a 7.8 inch diameter support disc 12.

Figure 3:
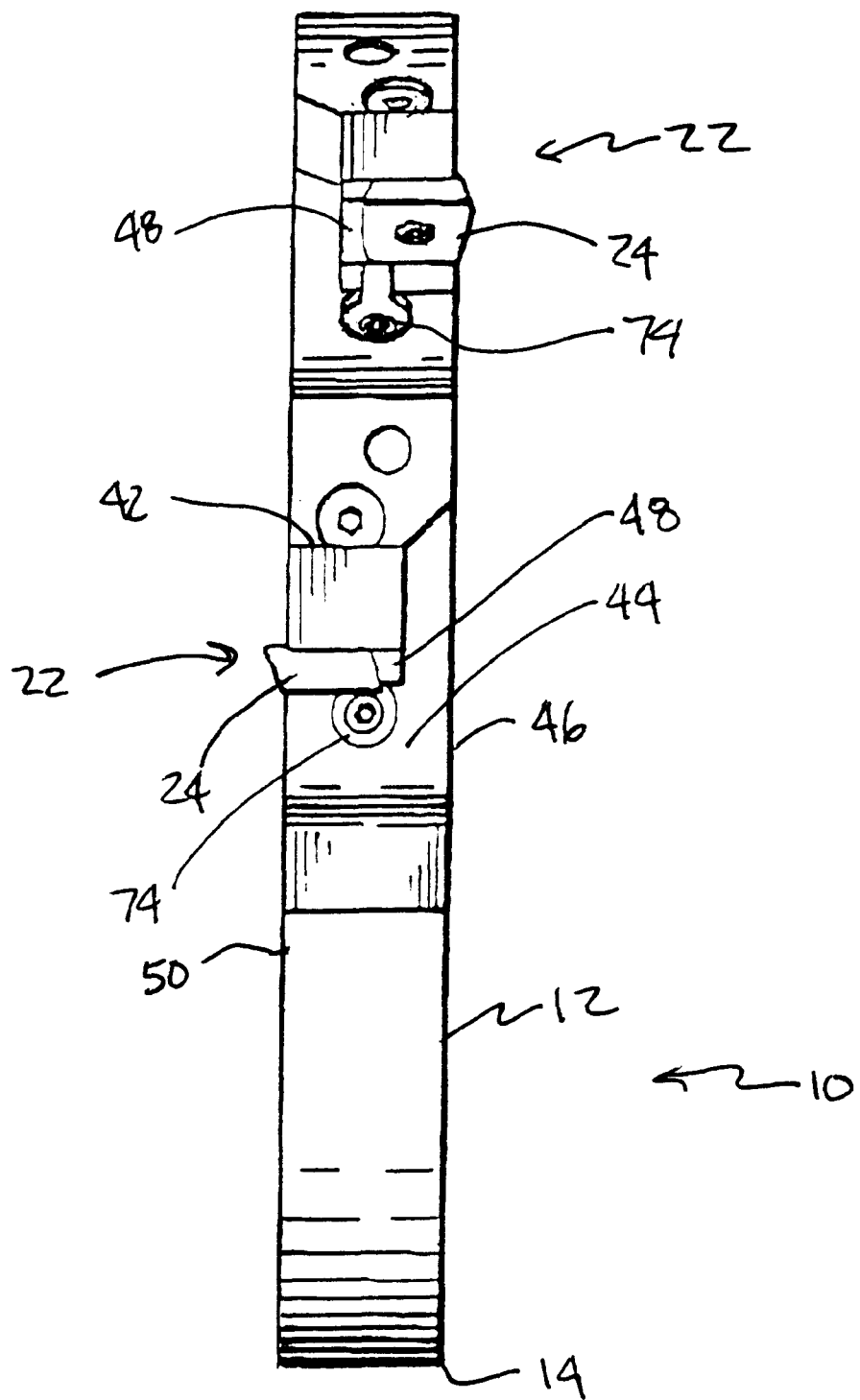
FIG. 3 is an end view of the slotting cutter of FIG. 1.
Figure 4:
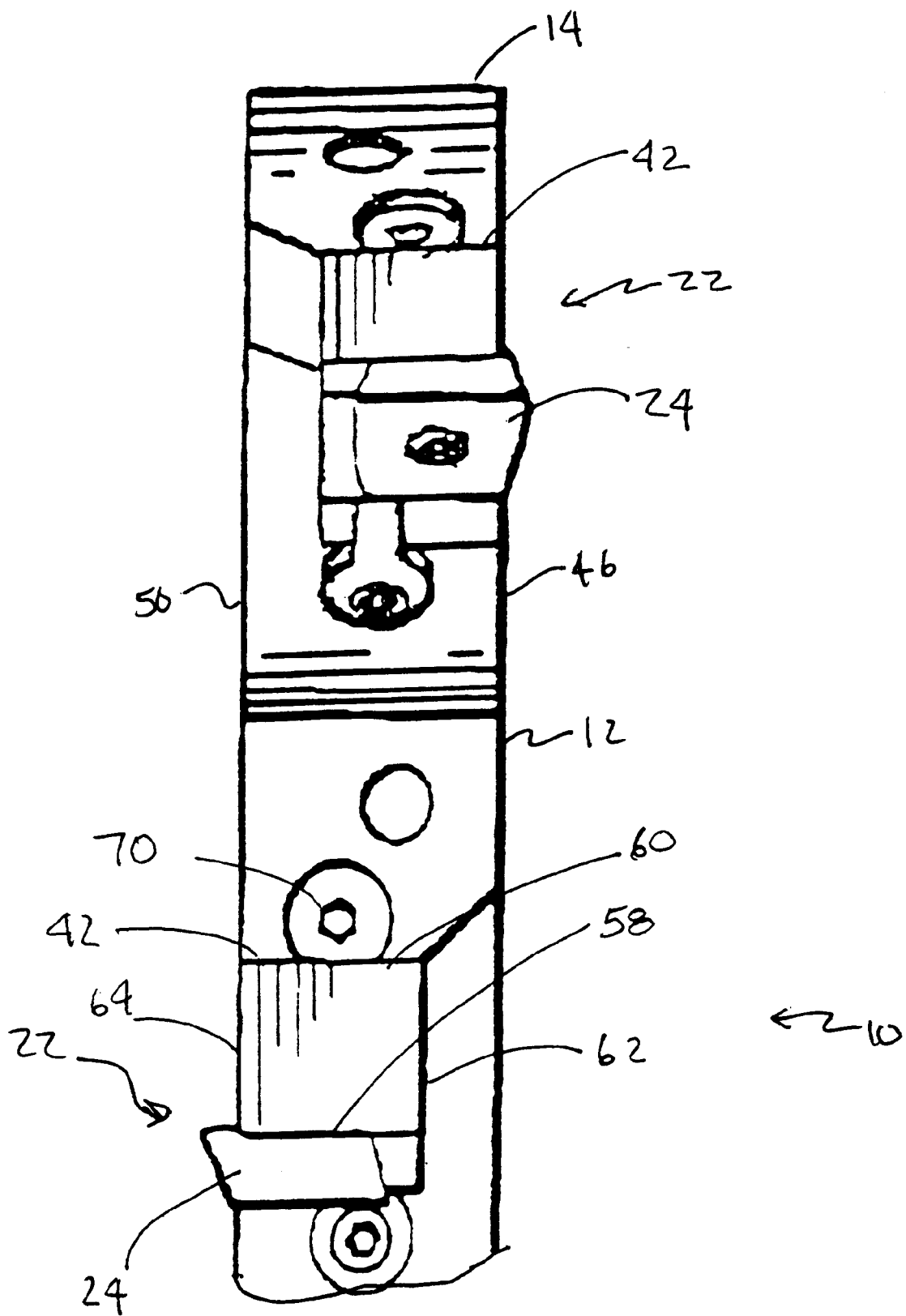
FIG. 4 is an enlarged partial view of the slotting cutter of FIG. 3.

Referring to FIGS. 1–3, the pocket 22 includes a cartridge assembly 54 fastened to the support disc 12. The cartridge assembly is fastened to the support disc by bolts,72 and a hold down clamp 74. The cartridge assembly 54 is substantially complementary in shape to the shape of the cutting inserts 24 to assist in accurate placement of the cutting inserts and, optionally, to prevent the inserts from rotating in response to the forces applied to its cutting edges during a cutting operation. The cartridge assembly 54 includes a cartridge body 56 having a generally rectangular leading face 58 and trailing face 60 interconnected by generally rectangular inner and outer walls 62. The leading face 58 of each cartridge assembly 54 receives a cutting insert 24 as previously described.

The leading face 58 extends radially downwardly and extends laterally from a first side 50 of the support disc to a side support member 48 that is offset or spaced from a second side 46 of the support disc. It will be appreciated that the side support member 48 is spaced from the second side 46 of the support disc 12 to provide clearance between the second side of the support disc and the cutting edge 40. Secured in position, every other cutting insert 24 extends laterally outwardly beyond the first side 50 of the support disc 12 and is spaced from the second side 46 of the support disc thereby providing increased side clearance for chip removal during the cutting process.

In a preferred embodiment, the inward side of the cutting edges 40 of adjacent inserts 24 are positioned to laterally overlap thereby providing an increased effective cutting path width. In addition, the cutting edges 40 of each insert are positioned within the pocket at the same radial distance from the central axis C. Accordingly, there is no overlap line presented by the cutting edges 40 of the inserts 24 along the periphery 14 of the slotting cutter 10 as the inserts cut a work piece.

It will be appreciated that the rake angle of the cutting inserts 24 in combination with the offset side support member 48 of the cartridge assembly 54 provides improved clearance and allows the cutter 10 to slot to a flat bottom and also contour cut the side and/or bottom of a slot in as many as 5 axes in a suitable multi; axis powered cutting tool. In addition, it will also be appreciated that the bottom wall 44 extending outwardly from the rear wall 42 allows for easy access to the insert 24 as necessary for replacement.

The cartridge assembly 54 may be used to facilitate precise positioning of the cutting edge 40 of the insert. As shown in the figures, a radial cartridge adjustment screw 70 allows for precise adjustment of the radial position of the cutting edge by mechanically moving the cutting edge radially with respect to the support disc.

A mounting screw 66 extends through a through an opening 68 in the insert 24 and engages a threaded opening in the rear wall of the cartridge assembly 54 to securely mount the insert into the pocket. Alternatively, a clamping mechanism of a type known in the prior art may be used to secure the insert.

Having described presently preferred embodiments of the invention, the invention may be otherwise embodied within the scope of the appended claims.

What is claimed is:

1. A slotting cutter comprising:

a support disc rotatable in a predetermined direction about a central axis, the support disc being of a generally cylindrical shape and having a first side, a second side, an outer periphery, and a central hub region extending through the first side and the second side and having a bore;

an even number of pockets equally spaced about the outer periphery of the support disc for receiving cutting inserts, each pocket opening radially and axially outwardly and defined by a rear wall having a first portion extending generally perpendicularly to the first and second sides of the disc and a second portion at an angle to the first portion, each pocket also being defined by a bottom wall;

wherein the pockets are arranged such that in a first set of every other one of the pockets, the rear wall first portion is adjacent to the first side of the disc and the rear wall second portion is adjacent to the second side of the disc, and in the remaining pockets, the rear wall first portion is adjacent to the second side of the disc and the rear wall second portion is adjacent to the first side of the disc;

each bottom wall extending outwardly from the respective rear wall toward the rear wall of the next preceding pocket and connected to the next preceding pocket through a connecting section;

each cutting insert including at least one cutting edge and having a first face and a second face generally parallel to and opposing one another, a first end and a second end positioned between the first and second faces, respectively, a top end and a bottom end positioned between the first and second faces and intersecting with the first and second ends;

wherein each pocket includes a cartridge assembly, each cartridge assembly having a cartridge body having a side support member for providing side support to a respective cutting insert, each cartridge body also having a leading face and a trailing face interconnected by inner and outer walls, each cartridge body trailing face being against the respective pocket rear wall first portion such that the insert held by a respective cartridge assembly extends beyond the side of the disc adjacent that rear wall first portion, thereby providing an increased effective cutting path width;

each cartridge assembly being radially adjustable with respect to the central axis by a respective adjustment member;

and wherein the cartridge assemblies do not contact the rear wall second portions of the pockets, thereby providing increased clearance for chip removal during cutting.

2. The slotting cutter of claim 1 wherein the at least one cutting edge of each insert is positioned at the same radial distance from the central axis of the support disc.

3. The slotting cutter of claim 1 wherein the first side and the second side of the support disc are tapered.

4. The slotting cutter of claim 1 wherein for each cutting inserts the intersection of the top end and the first end and of the bottom end and the second end is in the form of a radiused corner.

5. The slotting cutter of claim 4 wherein the at least one cutting edge is at the intersection of the first face and the top end.

6. The slotting cutter of claim 4 wherein the at least one cutting edge is at the intersection of the second face and the bottom end.

7. The slotting cutter of claim 4 wherein each insert includes two cutting edges.

8. The slotting cutter of claim 7 wherein the cutting edges are at the intersection of the first face and the top end and at the intersection of the second face and the bottom end.

9. The slotting cutter of claim 1 wherein the bottom wall of each pocket is substantially perpendicular to a radial line of the support disc.

10. A slotting cutter comprising:

a support disc rotatable in a predetermined direction about a central axis, the support disc being of a generally cylindrical shape and having a first side, a second side, an outer periphery, and a central hub region extending through the first side and the second side and having a bore;

an even number of pockets; equally spaced about the outer periphery of the support disc, each pocket opening radially and axially outwardly and defined by a rear wall having a first portion extending generally perpendicularly to the first and second sides of the disc and a second portion at an angle to the first portion, each pocket also being defined by a bottom wall;

wherein the pockets are arranged such that in a first set of every other one of the pockets, the rear wall first portion is adjacent to the first side of the disc and the rear wall second portion is adjacent to the second side of the disc, and in the remaining pockets, the rear wall first portion is adjacent to the second side of the disc and the rear wall second portion is adjacent to the first side of the disc;

each bottom wall extending outwardly from the respective rear wall toward the rear wall of the next preceding pocket and connected to the next preceding pocket through a connecting section;

wherein each pocket includes a cartridge assembly, each cartridge assembly having a cartridge body having a side support member for providing side support to a respective cutting insert, each cartridge body also having a leading face and a trailing face interconnected by inner and outer walls, each cartridge body trailing face being against the respective pocket rear wall first portion such that the insert held by a respective cartridge assembly extends beyond the side of the disc adjacent that rear wall first portion;

each cartridge assembly being radially adjustable with respect to the central axis by a respective adjustment member;

and wherein the cartridge assemblies do not contact the rear wall second portions of the pockets, thereby providing increased clearance for chip removal during cutting.

11. The slotting cutter of claim 10 wherein the at least one cutting edge of each insert is positioned at the same radial distance from the central axis of the support disc.

12. The slotting cutter of claim 10 wherein the first side and the second side of the support disc are tapered.

13. The slotting cutter of claim 10 wherein for each cutting insert, the intersection of the top end and the first end and of the bottom end and the second end is in the form of a radiused corner.

14. The slotting cutter of claim 13 wherein the at least one cutting edge is at the intersection of the first face and the top end.

15. The slotting cutter of claim 13 wherein the at least one cutting edge is at the intersection of the second face and the bottom end.

16. The slotting cutter of claim 13 wherein each insert includes two cutting edges.

17. The slotting cutter of claim 16 wherein the cutting edges are at the intersection of the first face and the top end and at the intersection of the second face and the bottom end.

18. The slotting cutter of claim 10 wherein the bottom wall of each pocket is substantially perpendicular to a radial line of the support disc.

* * * * *